W. D. LEAVITT.
Machine for Manufacturing Flour.
No. 220,626.  Patented Oct. 14, 1879.
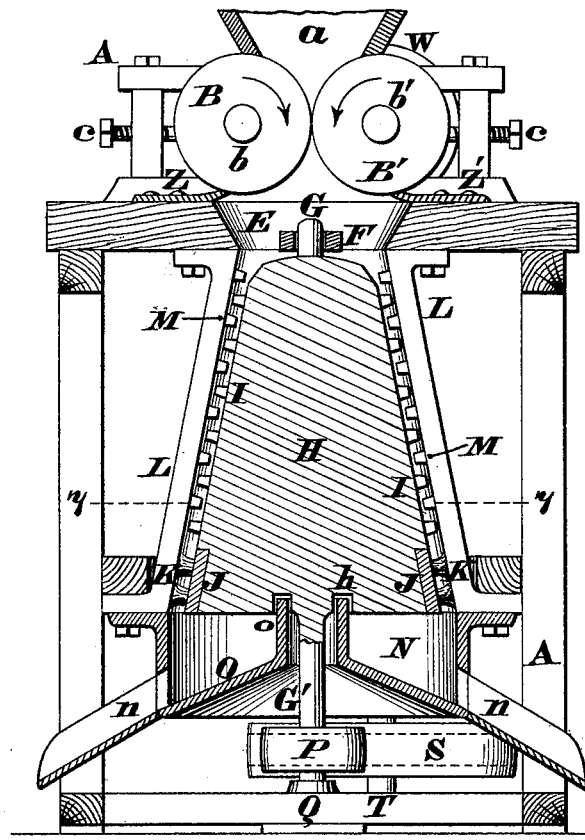
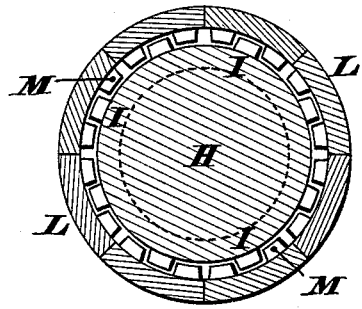
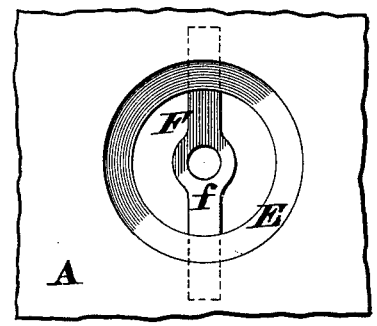
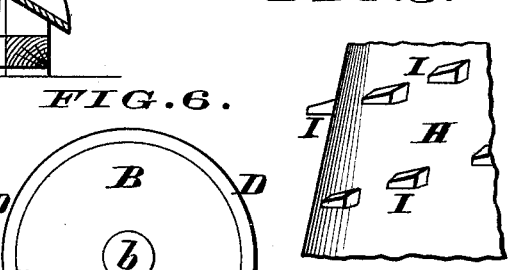
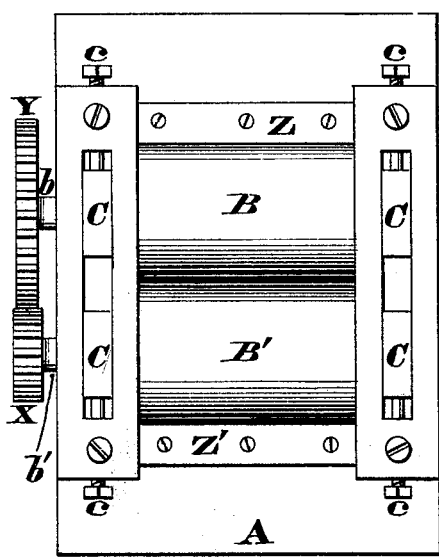
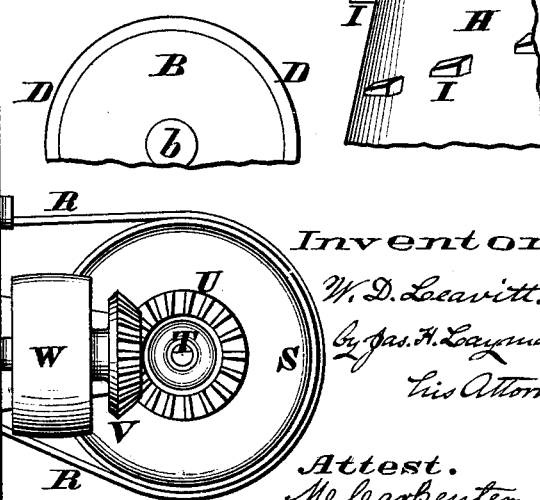
Inventor.
W. D. Leavitt.
By Jas. H. Layman
his Attorney
Attest.
M. Carpenter.
D. D. Bramble.
N. PETERS, PHOTO-LITHOGRAPHER, WASHINGTON, D. C.

UNITED STATES PATENT OFFICE.

WILLIAM D. LEAVITT, OF CINCINNATI, OHIO, ASSIGNOR OF TWO-THIRDS OF HIS RIGHT TO DAVID D. BRAMBLE AND MARION CARPENTER, OF SAME PLACE; SAID CARPENTER ASSIGNOR TO HERMAN F. REUM, OF SAME PLACE.

IMPROVEMENT IN MACHINES FOR MANUFACTURING FLOUR.

Specification forming part of Letters Patent No. 220,626, dated October 14, 1879; application filed September 27, 1877.

*To all whom it may concern:*

Be it known that I, WILLIAM D. LEAVITT, of Cincinnati, Hamilton county, Ohio, have invented certain new and useful Improvements in Machinery for the Manufacture of Flour and Meal, of which the following is a specification.

My invention comprises a novel arrangement of parts for those grinding-mills which employ one or more pairs of crushing-rolls and a beater or decorticator for reducing grain to flour or meal.

In the present case two crushing-rolls are applied to the upper part of the mill, and are adapted to discharge the cracked grain directly down upon the beating device or decorticator, which beater consists of a vertical cone, or the frustum of a cone, having its apex presented toward said rolls, and arranged to revolve within a suitable casing or shell. This beater is armed with blades or other projections, that coact with the internal ribs of the casing in separating the meal from the previously-cracked grain, said beater being geared to revolve at such a speed as to produce flour of any desired grain.

The above-described crushing-rolls are preferably arranged to revolve at different velocities.

In the annexed drawings, Figure 1 is a vertical section of a flour-mill embodying my improvements, the upper portion of the hopper being broken away. Fig. 2 is a plan of said mill, the hopper being removed. Fig. 3 is a transverse section of the beater and its inclosing-case at the line $y\ y$. Fig. 4 is a plan of the upper bearing of the beater. Figs. 5 and 6 represent modifications of my invention.

The main frame A, which is of any suitable size and shape, is provided at top with hopper $a$, into which hopper the grain may be fed with any approved form of shoe. This hopper is adapted to conduct the grain to the squeezing-rolls B B', whose respective shafts $b\ b'$ are journaled in boxes C, capable of being adjusted with screws $c$, so as to cause said rolls to approach each other or to recede, as occasion may require. These rolls are true cylinders with perfectly smooth peripheries, and they should be composed of steel or chilled iron, so as not to be injured by the passage of any foreign substance between them. If preferred, these rolls may be surrounded with an envelope of enamel or any other durable coating, as shown at D in Fig. 6. Furthermore, these rolls are arranged to revolve at different velocities, the driver B' rotating somewhat slower than the other roll, B.

Located beneath said rolls B B' is a downwardly-converging throat, E, across which is secured a bar, F, whose aperture $f$ serves as a bearing for the upper journal, G, of the beater H, which beater may be either hollow or solid, or it may be made in several segments or sections. This beater is the frustum of a cone, and is armed with a series of blades, or teeth, or ribs, or other projections, I, which are preferably disposed around said cone in the helical manner shown in Fig. 5. This helical arrangement of the projections I not only insures the descent of grain within the mill, but it also induces a current of air through the space between said beater and the fixed or inclosing shell, thereby obviating the use of a fan or other special appliance for cooling the grain. The projections I may be of any suitable shape to produce the desired result.

The lower or larger end of the cone is surrounded with a band, J, carrying brushes K, composed either of wire, or bristles, or splints, or any other flexible material. G' is the lower shaft or journal of the beater, which shaft is stepped in the bearing Q.

L represents a fixed conical shell or case, within which the beater proper rotates, said shell being secured to the main frame A in any suitable manner. The interior of this shell is parallel with the cone H, an annular space being afforded between the members H and L to permit the teeth I to operate in. M are the inwardly-projecting teeth or ribs of said fixed shell, which shell L is preferably composed of a number of segments, as seen in Fig. 3.

Located beneath the beater and its inclosing-shell is a receiver, N, having one or more ventages, n, and a shed-floor, O, whose central portion is provided with a neck, o, the upper end of the latter being inserted in an annular groove, h, of beater H. By this arrangement of neck and groove any escape of flour at the center of the receiver is effectually prevented.

Neck o is traversed by the beater-shaft G', to which a pulley, P, is fixed, said pulley being driven by a band, R, from the large pulley S. This pulley S is secured near the lower end of a vertical shaft, T, that is surmounted with a bevel-wheel, U, which gears with a similar wheel, V, the latter being keyed to shaft b' of driving-roll B'. This shaft b' has mounted upon it a pulley, W, which is driven by a belt from any convenient motor. Furthermore, this shaft has secured to it a pinion, X, that gears with wheel Y, applied to the other shaft, b. Z Z' are scrapers for cleaning the rolls B B'.

The operation of my grinding-mill is as follows: The wheat or other grain is drawn down from hopper a by the oppositely-revolving rolls B B', which subject the grain to a squeezing instead of tearing action, as is done with ordinary millstones, and the result of this operation is to crack the shell of the grain, but without at the same time causing a complete separation of the flour or meal from the shell. The grain in this cracked condition is discharged in a more or less unbroken sheet into the throat E of the mill, and then descends, so as to be acted upon by the beater H, whose blades I force the grain down within the shell L, and compel the grain to escape into receiver N. During this descent the teeth I and M coact to cause a more thorough separation of the meal or flour from the shell of the grain, the meal being finally operated on by the brushes K. These brushes sweep out the smaller particles of meal from the shells, so as to render the meal at once ready for use, unless a very fine grade of flour is needed, in which event the flour is run through an ordinary bolting apparatus.

One great advantage peculiar to my improved process of manufacturing flour is, that the meal is not burned by being subjected to the grinding action of the stones after the meal has been separated from the hulls of the grain.

Another advantage is, that the flour is entirely free from millstone-grit, of which a great quantity is always incorporated in meal ground in the usual manner.

I am aware that it is not new to crush grain with rolls and then separate the meal or flour from the crushed grain with a beater, as such a construction of mill is seen in Letters Patent No. 7,447, issued June 18, 1850, to J. R. Stafford, and therefore my claim is limited to the specific combination of crushing-rolls and vertical cone beater located below them, as above described.

I claim as my invention—

The combination, in a grinding-mill, of oppositely-revolving smooth-faced rolls B b B' b', throat E, casing L M, and conical beater G G' H I, the axis of said beater being disposed vertically and in line with the passage between said crushing-rolls B B', as herein described and set forth.

In testimony of which invention I hereunto set my hand.

WILLIAM D. LEAVITT.

Witnesses:
  JAMES H. LAYMAN,
  GEORGE H. KOLKER.